United States Patent Office 3,043,869
Patented July 10, 1962

3,043,869
SEPARATION OF PHTHALIC ACIDS
Stanford J. Hetzel, Newtown Square, Pa., assignor to Sun Oil Company, Philadelphia, Pa., a corporation of New Jersey
No Drawing. Filed June 2, 1958, Ser. No. 738,934
2 Claims. (Cl. 260—525)

This invention relates to the separation of isophthalic acid from terephthalic acid.

In the oxidation of mixtures of m-xylene and p-xylene, a dibasic acid product including isophthalic acid and terephthalic acid is produced. It is frequently desired to separate isophthalic acid from terephthalic acid in the oxidation product.

It has been proposed to accomplish this separation by selectively dissolving an alkali salt of isophthalic acid in an aqueous solvent. This aqueous solvent may contain an inorganic salt or an alcohol in addition to water. The undissolved terephthalic acid salt is filtered from the solution of isophthalic acid salt in the aqueous solvent. Terephthalic acid is recovered from the filter cake by acidification with mineral acid. Isophthalic acid is recovered from the filtrate by similar acidification.

In performing this separation of the dibasic acid salts, it is desirable to initially dissolve both salts, i.e. the terephthalic acid and isophthalic acid baths, in water in order to be able to filter the resulting solution and thereby remove solid, metal-containing impurities. Frequently this is the only satisfactory way to remove these impurities.

However, in prior art operation, after such filtration, it is necessary to employ one of several methods for precipitating the terephthalic acid salt from the solution. This may be done, for example, by evaporating water from the solution or by adding an inorganic salt or an alcohol. It would be desirable to avoid the necessity of employing one of these methods for precipitating the terephthalic acid salt.

According to the present invention, the disadvantages of the prior art are overcome by employing the new principle of separating terephthalic acid in the free acid form from an aqueous solution of the isophthalic acid salt. This result of separating the terephthalic acid in the free acid rather than the salt form is accomplished by partially acidifying an aqueous solution containing both isophthalic acid and terephthalic acid salt. It has been found that the free acid liberated by the partial acidification is a concentrate of terephthalic acid, rather than a mixture containing approximately the same ratio of constituents as in the original salt mixture.

The procedure according to the invention eliminates the necessity for evaporating water or for adding inorganic salt or alcohol. It also eliminates the necessity for a separate acidification of the terephthalic acid salt after separation thereof from the aqueous solution of isophthalic acid salt.

The partial acidification according to the invention, and the subsequent separation of the liberated free acid can be performed at any suitable temperature. Preferably both of these operations are performed at room temperature or a moderately elevated temperature, e.g. up to 150° F. The use of higher temperatures, e.g. up to 300° F. or above, is permissible, but usually does not provide any advantage sufficient to make the heating desirable. Elevated pressure may be employed if necessary in order to prevent excessive vaporization of water during the operation.

The amount of mineral acid, e.g. sulfuric acid, hydrochloric acid, etc. which is employed in the partial acidification is preferably an approximately stoichiometric amount based on terephthalic acid salt, i.e. the theoretical amount of acid needed to liberate all of the terephthalic acid and none of the isophthalic acid in the free acid form. However, any amount less than the stoichiometric amount based on both salts can be employed. Preferably the amount is within the approximate range from 0.1 to 0.9 times the stoichiometric amount based on both salts, and within the approximate range from 0.5 to 1.5 times the stoichiometric amount based on terephthalic acid salt.

Any desired procedure for separating the liberated free acid in solid form can be employed. Filtration is a preferred method. The aqueous solution of isophthalic acid salt concentrate obtained upon separation can be subsequently treated for recovery of free isophthalic acid concentrate in any suitable manner, for example by treatment with mineral acid, or by heating for a sufficient period of time to decompose the dibasic acid salt, in the case where that salt is an ammonium salt capable of thermal decomposition to evolve gaseous ammonia.

The salts which are partially acidified according to the invention can be alkali metal, e.g. sodium, potassium, lithium salts, etc. or ammonium salts. Ammonium salts are generally preferred for the purpose of the invention.

The following example illustrates the invention:

The starting material for this example is a filter cake obtained in the filtration of solid products obtained in partial oxidation of a mixture of m-xylene and p-xylene in liquid phase by means of oxygen. The filter cake contains about 60 parts by weight of isophthalic acid, 40 parts of terephthalic acid and 25 parts of xylenes. The filter cake is dissolved at room temperature in a mixture of about 60 cc. of 28% aqueous ammonium hydroxide and 800 cc. of water per 100 grams of filter cake. The resulting aqueous solution of ammonium isophthalate and ammonium terephthalate mixed with xylenes is passed through a filter in order to remove small quantities of metallic impurities which are not dissolved in the aqueous ammonium hydroxide. The filtrate is subjected to gravimetric separation in order to obtain xylenes as a layer separate from the aqueous ammonium hydroxide layer. The latter layer has a pH of about 9. To it is added 96% sulfuric acid in the stoichiometric amount, assuming complete liberation of terephthalic acid as free acid and no liberation of isophthalic acid as free acid. This contacting is performed at room temperature with agitation for about 30 minutes. A solid phase constituting free dibasic acid is precipitated from the solution. The resulting mixture is filtered at room temperature to obtain a filter cake containing about 87% terephthalic acid and 13% isophthalic acid and constituting about 28 weight percent of the original mixture of isophthalic acid and terephthalic acid. The pH of the filtrate is about 5. To it is added additional 96% sulfuric acid in amount sufficient to reduce the pH to about 3. This results in precipitation of additional solid dibasic acid from the solution. The precipitated dibasic acid is filtered to obtain a filter cake comprising about 66% of the original mixture of isophthalic acid and terephthalic acid, and containing about 81% isophthalic acid and 19% terephthalic acid.

Where it is desired to obtain isophthalic acid and terephthalic acid products which are purer than those obtained in a single step separation as described above, the separation procedure can be repeated. Alternatively, the products obtained in the separation described can be subjected to other separation procedures such as the selective dissolving of isophthalic acid in alcohol or any other suitable procedure. The cost involved in alcohol separation, for example, of isophthalic acid and terephthalic acid can be substantially reduced by first obtaining concentrates of the respective acids prior to the alcohol separation.

Although the invention is preferably applied to alkali metal or ammonium salts, it can also be applied to salts of organic bases, e.g. methyl amine, triethanolamine aniline, cyclohexylamine, pyridine, morpholine, etc. Generally similar results to those described previously are obtained with water-soluble salts generally, regardless of the particular nature of the basic component.

The invention claimed is:

1. Process for separating isophthalic acid from terephthalic acid which comprises contacting an aqueous solution of a water-soluble salt of isophthalic acid and a water-soluble salt of terephthalic acid with a treating agent consisting essentially of mineral acid in amount from 0.5 to 1.5 times the stoichiometric amount based on terephthalic acid salt and less than the stoichiometric amount based on both salts, at a temperature not greater than about 300° F. and a pressure sufficient to prevent excessive vaporization of water and to maintain said solution in liquid phase at said temperature, thereby to precipitate from the solution a terephthalic acid concentrate, and separating the concentrate from the resulting aqueous solution of isophthalic acid salt concentrate.

2. Process according to claim 1 wherein the amount of treating agent is in the range from 0.1 to 0.9 times the stoichiometric amount based on both salts.

References Cited in the file of this patent

UNITED STATES PATENTS

| | | |
|---|---|---|
| 1,822,016 | Daniels | Sept. 8, 1931 |
| 2,697,723 | Carlston et al. | Dec. 21, 1954 |
| 2,863,913 | Raecke et al. | Dec. 9, 1958 |

OTHER REFERENCES

Thamer et al.: Chem. Absts., vol. 46, col. 7407 (1952).

Montgomery et al.: Ind. & Eng. Chem., vol. 47, No. 6, pages 1274–6 (1955).